US008701164B2

(12) United States Patent
Dutta et al.

(10) Patent No.: US 8,701,164 B2
(45) Date of Patent: Apr. 15, 2014

(54) KEY CASHING, QOS AND MULTICAST EXTENSIONS TO MEDIA-INDEPENDENT PRE-AUTHENTICATION

(75) Inventors: Ashutosh Dutta, Bridgewater, NJ (US); Victor Fajardo, Robbinsville, NJ (US); Yoshihiro Oba, Englewood Cliffs, NJ (US); Kenichi Tanuichi, Jersey City, NJ (US)

(73) Assignees: Toshiba America Research, Inc., Washington, DC (US); Teleordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 13/207,027

(22) Filed: Aug. 10, 2011

(65) Prior Publication Data
US 2012/0096520 A1 Apr. 19, 2012

Related U.S. Application Data

(62) Division of application No. 11/845,075, filed on Aug. 26, 2007, now abandoned.

(60) Provisional application No. 60/862,448, filed on Oct. 21, 2006.

(51) Int. Cl.
G06F 21/20 (2006.01)
H03D 3/22 (2006.01)

(52) U.S. Cl.
USPC ............... 726/4; 726/3; 380/272; 713/168; 370/331; 455/436; 709/227; 709/237

(58) Field of Classification Search
USPC .......... 726/1–4; 709/227–228, 237, 223–224; 713/168; 380/270, 272; 370/331; 455/411, 436
See application file for complete search history.

(56) References Cited

U.S. PATENT DOCUMENTS

| 6,988,146 B1* | 1/2006 | Magret et al. ................. 709/238 |
| 7,046,647 B2 | 5/2006 | Oba et al. |
| 7,161,914 B2 | 1/2007 | Shoaib et al. |
| 7,286,671 B2 | 10/2007 | Yegin et al. |
| 7,418,596 B1 | 8/2008 | Carroll et al. |

(Continued)

FOREIGN PATENT DOCUMENTS

| EP | 1484866 A1 | 12/2004 |
| WO | 2005-072183 A2 | 8/2005 |
| WO | 2006/021236 A1 | 3/2006 |
| WO | 2006-083039 A1 | 8/2006 |

OTHER PUBLICATIONS

Charles E Perkins et al, Optimized Smooth Handoffs in Mobile IP, pp. 340-346, IEEE, 1999.*

(Continued)

Primary Examiner — David García Cervetti
Assistant Examiner — Shanto M Abedin
(74) Attorney, Agent, or Firm — Westerman, Hattori, Daniels & Adrian, LLP

(57) ABSTRACT

This present application relates to, among other things, Key Caching, QoS and Multicast extensions and improvements to the Media-independent Pre-Authentication (MPA) framework, a new handover optimization mechanism that has a potential to address issues on existing mobility management protocols and mobility optimization mechanisms. MPA is a mobile assisted, secure handover optimization scheme that works over any link-layer and with any mobility management protocol.

4 Claims, 4 Drawing Sheets

(56) References Cited

U.S. PATENT DOCUMENTS

| | | | |
|---|---|---|---|
| 7,738,882 B2 | 6/2010 | Dutta et al. | |
| 7,813,319 B2* | 10/2010 | Dutta et al. | 370/331 |
| 7,869,438 B2 | 1/2011 | Batta | |
| 7,948,918 B2* | 5/2011 | Yaqub | 370/254 |
| 8,098,627 B2* | 1/2012 | Dutta et al. | 370/331 |
| 2002/0114469 A1 | 8/2002 | Faccin et al. | |
| 2003/0031151 A1 | 2/2003 | Sharma et al. | |
| 2003/0084287 A1 | 5/2003 | Wang et al. | |
| 2003/0092444 A1 | 5/2003 | Sengodan et al. | |
| 2003/0125027 A1* | 7/2003 | Gwon et al. | 455/436 |
| 2004/0136348 A1* | 7/2004 | Han | 370/338 |
| 2004/0228304 A1 | 11/2004 | Riedel et al. | |
| 2005/0130659 A1 | 6/2005 | Grech et al. | |
| 2005/0163078 A1* | 7/2005 | Oba et al. | 370/331 |
| 2006/0029020 A1* | 2/2006 | Jung et al. | 370/331 |
| 2006/0041742 A1* | 2/2006 | Oba | 713/151 |
| 2006/0083377 A1* | 4/2006 | Ptasinski | 380/270 |
| 2006/0120171 A1 | 6/2006 | Touati et al. | |
| 2006/0187858 A1 | 8/2006 | Kenichi et al. | |
| 2007/0041344 A1* | 2/2007 | Yaqub et al. | 370/331 |
| 2007/0047491 A1* | 3/2007 | Dutta et al. | 370/331 |
| 2007/0124592 A1 | 5/2007 | Oyama | |
| 2007/0189218 A1 | 8/2007 | Oba et al. | |
| 2007/0280174 A1* | 12/2007 | Pun | 370/338 |
| 2008/0069050 A1 | 3/2008 | Dutta et al. | |

OTHER PUBLICATIONS

Ashutosh Dutta et al, Secured Mobile Multimedia Communication for Wireless Internet, pp. 180-185, IEEE, 2004.*
Ashutosh Dutta et al, MPA assisted Optimized Proactive handoff Scheme, IEEE, 2005.*
Wally Chen et al, Proactive hand-Off Target Orientation Cache in Fast Handover for Mobile IPv6, IEEE, 2005.*
Canadian Office Action dated Apr. 18, 2012, issued in corresponding Canadian Patent Application No. 2,667,180; (3 pages).
European Search Report dated Mar. 6, 2012, issued in corresponding European Patent Application No. 07870798.1 (7 pages).
International Search Report of PCT/US07/22317, date of mailing Jun. 5, 2008.
Ashutosh Dutta et al.; "MPA assisted Optimized Proactive Handoff Scheme"; MobiQuitous 2005, The Second Annual International Conference on Mobile and Ubiquitous Systems Netgworking and Services; Jul. 17-21, 2005; pp. 155-165.
Hakima Chaouchi; "QoS-aware handover control in currect and future wireless/ mobile networks" Annals of Telecommunications, vol. 59, No. 5-6; pp. 731-746.
Japanese Office Action dated Nov. 16, 2010, issued in corresponding Japanese Patent Application No. 2007-273266.
S. Bradner, "The Internet Standards Process-Revision", Oct. 1996, pp. 1-34, The Internet Society, USA.
S. Bradner, "IETF Rights in Contributions", Mar. 2005, pp. 1-17, The Internet Society, USA.
C. Perkins,"IP Mobility Support foir IPv4", Aug. 2002, pp. 1-77, The Internet Society, USA.
B. Aboba, "Extensible Authentication Protocol (EAP)", Jun. 2004, pp. 1-52, The Internet Society, USA.
D. Johnson, "Mobility Support in IPv6", Jun. 2004, pp. 1-55, The Internet Society, USA.
B. Braden, "Resource ReSerVation Protocol (RSVP)—Version 1 Functional Specification", Sep. 1997, pp. 1-105, USA.
K. Malki, "Low Latency Handoffs in Mobile IPv4", Oct. 2005, pp. 1-58, The Internet Society, USA.
R. Koodli, "Fast Handovers for Mobile IPv6", Oct. 2004, pp. 1-53, The Internet Society, USA.
M. Liebsch, "Candidate Access Router Discovery", Sep. 2004, pp. 1-47, The Internet Society, USA.
J. Loughney, "Context Transfer Protocol", Aug. 2004, pp. 1-33, The Internet Society, USA.
B. Aboba, "Extensible Authentication Protocol (EAP) Key Management Framework", Jun. 2006, pp. 1-59, The Internet Society, USA.
D. Forsberg, "Protocol for Carrying Authentication for Network Access (PANA)", Aug. 2006, pp. 1-74, The Internet Society, USA.
"International Telephone Connections and Circuits—General Recommendations on the Transmission Quality for an Entire International Telephone Connection", ITU-T Recommendation G. 114, May 2003, pp. 1-20, ITU-T, USA.
The E-Model, a computational model for use in transmission planning, ITU-T Recommendation G. 107, May 2000, pp. 1-24, ITU-T, USA.
T. Kivnen, "Design of the MOBIKE Protocol", Mar. 2006, pp. 1-37, The Internet Society, USA.
R. Moskowitz, "Host Identity Protocol", Jun. 2006, p. 1-101, The Internet Society, USA.
G. Almes, "A One-way Delay Metric for IPPM", Sep. 1999, pp. 1-19, The Internet Society, USA.
G. Almes, "A One-way Packet Loss Metric for IPPM", Sep. 1999, pp. 1-15, The Internet Society, USA.
G. Almes, "A Round-trip Metric for IPPM", Sep. 1999, p. 1-19, The Internet Society, USA.
W. Simpson, "IP in IP Tunneling", Oct. 1995, pp. 1-8, The Internet Society, USA.
M. Patrick, "DHCP Relay Agent Information Option", Jan. 2001, pp. 1-14, The Internet Society, USA.
S. Park, "Rapid Commit Option for DHCPv4", Jun. 2004, p. 1-12, The Internet Society, USA.
V. Fajardo, "Media-Independent Pre-Authentication (MPA) Implementation Results", Mar. 2006, p. 1-27, The Internet Society, USA.
R. Wakikawa, "Multiple Care-of Addresses Registration", Feb. 2006, p. 1-36, The Internet Society, USA.
J. Manner, "NSLP for Quality-of-Service Signaling", Jun. 2006, p. 1-78, The Internet Society, USA.
A. Campbell, "Design , Implementation, and Evaluation of Cellular IP", IEEE Personal communication, Aug. 2000, pp. 1-8, USA.
R. Ramjee, "HAWAII: A Domain-based Approach for Supporting Mobility in Wide-area Wireless networks", International Conference on Network Protocols ICNP'99, p. 1-13, USA.
S. Das, "IDMP: An Intra-Domain Mobility Management Protocol for Next Generation Wireless Networks", IEEE Wireless Communication Magazine, Oct. 2000, pp. 1-11, USA.
S. Shin, "Reducing MAC Layer Handoff Latency in IEEE 802.11 Wireless LANs", MOBIWAC Workshop, pp. 1-8, USA.
A Dutta, "Secured Universal Mobility", WMASH 2004, 2004, p. 1-10, USA.
Dutta, A., "GPS-IP based fast-handoff for Mobiles", NYMAN 2003, p. 1-3, USA.
Y. Mghazli, "MPA using IKEv2 and MOBIKE", Feb. 2006, p. 1-17, The Internet Society, USA.
S. Bradner, "The Internet Standards Process", Oct. 1996, pp. 1-34, Network Working Group, USA.
S. Bradner, Intellectual Property Rights in IETF Technology, Mar. 2005, p. 1-16, The Internet Society, USA.
C. Perkins, IP Mobility Support for IPv4, pp. 1-98, Aug. 2002, The Internet Society, USA.
B. Aboba, Extensible Authentication Protocol, Jun. 2004, p. 1-70, The Internet Society, USA.
D. Johnson, Mobility Support in IPv6, Jun. 2004, p. 1-155, The Internet Society, USA.
R. Braden, Resource Reservation Protocol, Version 1, Sep. 1997, p. 1-105, The Internet Society, USA.
K. El Malki, Low Latency Handoffs in Mobile IPv4, p. 1-52, Oct. 2003, Internet Draft, USA.
R. Koodli, "Fast Handovers for Mobile IPv6", Jul. 2005, p. 1-40, The Internet Society, USA.
M. Liebsch, "Candidate Access Router Discovery", Jul. 2005, p. 1-46, The Internet Draft, USA.
Context Transfer Protocol, p. 1-46, The Internet Society, USA.
B. Aboba, Extensible Authentication Protocol, Key Management Framework, Nov. 11, 2007, p. 1-73, Internet Draft, USA.
D. Forsberg, "Protocol for Carrying Authentication for Network Access", May 2008, Network Working Group, USA.
G. 107, ITU-T Recommendation, The E-model, a Computational Model for Use in Transmission Planning, May 2000, p. 1-26, USA.

(56) References Cited

OTHER PUBLICATIONS

T. Kivinen, Design of the IKEv2 Mobility and Multihoming (MOBIKE) Protocol, Aug. 2006, p. 1-29, The internet Society, USA.
R. Moskowitz, Host Identity Protocol, May 15, 2003, p. 1-53, Internet Draft, USA.
G. Almes, A One-Way Delay Metric for IPPM, Sep. 1999, p. 1-23, The Internet Society, USA.
G. Almes, A One-Way Packet Loss Metric for IPPM, Sep. 1999, p. 1-15, The internet Society, USA.
IP in IP Tunneling, p. 1-11, Network Working Group, USA.
DHCP Relay Agent Information Option, p. 1-20, Network Working Group, USA.
S. Park, Rapid Commit Option for DHCPv4, Apr. 10, 2004, p. 1-11, Internet Draft, USA.
V. Farajardo, Media-Independent Pre-Authentication Implementation Results, Mar. 4, 2006, p. 1-27, Internet Draft, USA.
R. Wakikawa, Multiple Care of Addresses Registration, May 30, 2008, p. 1-42, Internet Draft, USA.
J. Manner, NSLP for Quality of Service Signaling, Feb. 7, 2008, p. 1-91, The Internet Draft, USA.
H. Schulzrinne, Application Layer Mobility Using SIP, p. 1-13, Columbia University, USA.
R. Ramjee, HAWAII: A Domain-based Approach for Supporting Mobility in Wide-area Wireless Networks, p. 1-16, USA.
S. Das, IDMP—An Intra-Domain Mobility Management Protocol for Next Generation Wireless Networks, p. 1-11, Telcordia Technologies Inc. USA.
Japanese Office Action dated Nov. 16, 2010, issued in corresponding Japanese Patent Application No. 2005-376024.
E. Gusafsson, Mobile IPv4 Regional Registration, Nov. 29, 2005, p. 1-31, Internet Draft, USA.
H. Yokota, Link Layer Assisted Mobile IP Fast Handoff Method Over Wireless LAN Networks, 2002, p. 131-139, ACM, USA.
S. Shin, Reducing MAC Layer Handoff Latency in IEEE 802.11 Wireless LAN's, p. 1-11, USA.
A. Dutta, Fast Handoff Schemes for Application Layer Mobility Management, p. 1-7, USA.
Y. Gwon, Fast Handoffs in Wireless LAN Networks Using Mobile Initiated Tunnel Handoff Protocol for IPv4, Mar. 20, 2003, p. 1248-1253, vol. 2, USA.
A. Dutta, GPS-IP based Fast-Handoff for Mobiles, p. 1-3, USA.
Y. Mghazli, MPA using IKEv2 and MOBIKE, Feb. 23, 2006, pp. 1-17, Internet Draft, USA.

* cited by examiner

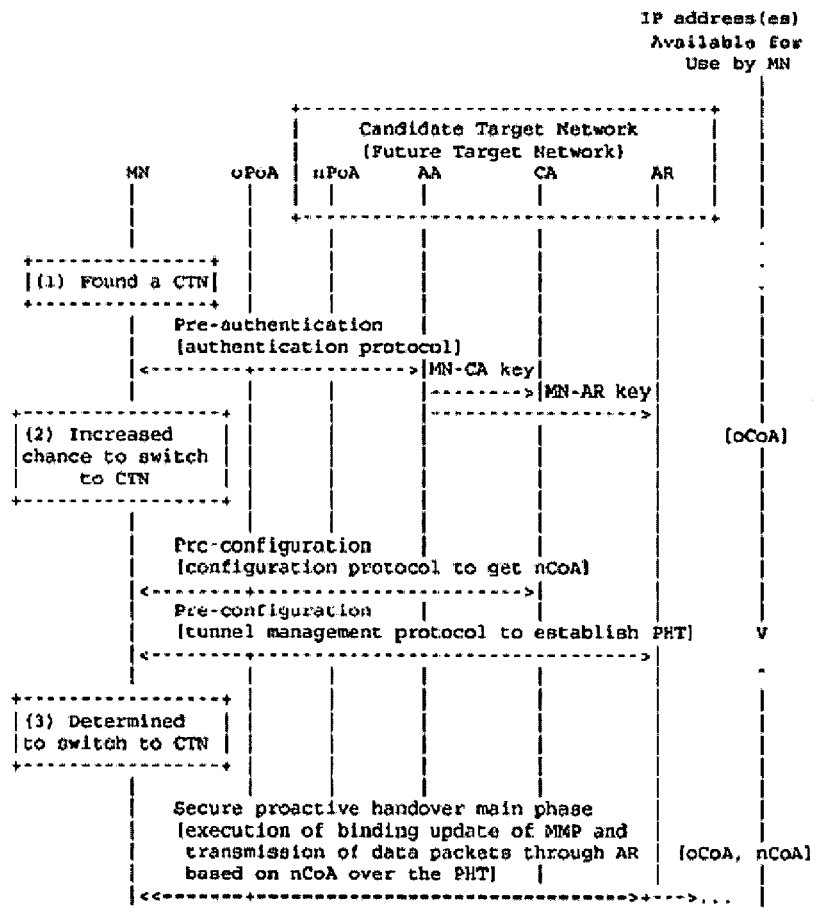
FIG. 1: Basic Communication Flow (1/2)
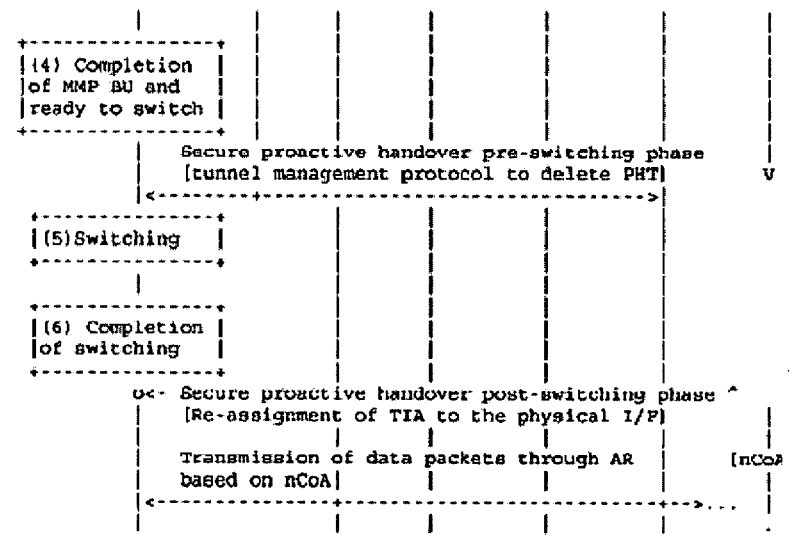
FIG. 2: Basic Communication Flow (2/2)

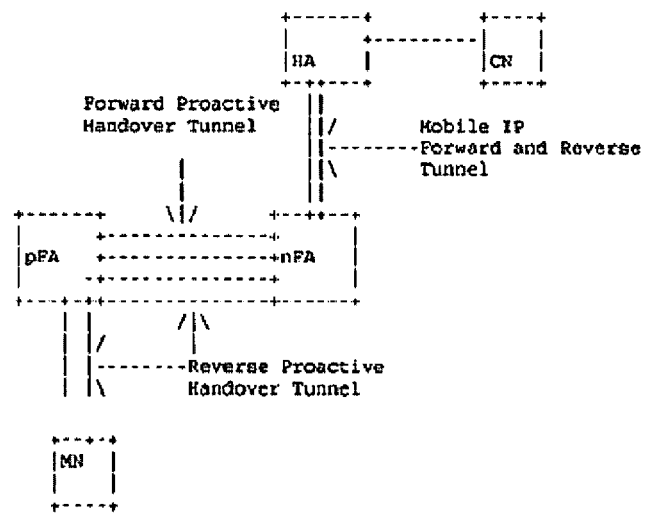
FIG. 3: MPA with FA-CoA Scenario
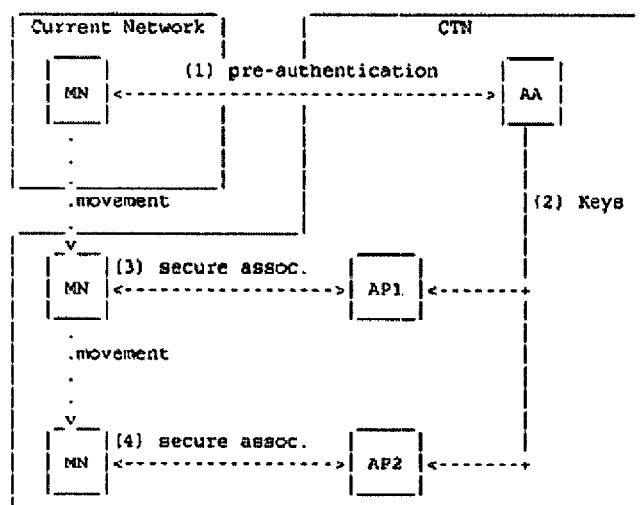
FIG. 4: Bootstrapping Link-layer Security

KEY CASHING, QOS AND MULTICAST EXTENSIONS TO MEDIA-INDEPENDENT PRE-AUTHENTICATION

PRIORITY APPLICATIONS

The present application is a divisional of U.S. Ser. No. 11/845,075, filed on Aug. 26, 2007, which is a non-provisional of U.S. provisional application No. 60/862,448 filed on Oct. 21, 2006, the entire disclosures of which applications are both incorporated herein by reference as though recited herein in full.

BACKGROUND

Background Discussion

The present application incorporates by reference the entireties of the contents of the following U.S. patent applications: U.S. application Ser. No. 11/307,362, filed Feb. 2, 2006, entitled A Framework of Media Independent Pre-Authentication; U.S. application Ser. No. 11/308,175, filed Mar. 9, 2006, entitled Framework of Media Independent Pre-Authentication (Support for PANA); and U.S. Ser. No. 11/279,856, filed on Apr. 14, 2006, entitled Framework of Media-Independent Pre-Authentication Improvements: Including Considerations for Failed Switching and Switchback.

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media Independent Handover Services:

In I.E.E.E. P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems. For background reference and education purposes, portions of said I.E.E.E. 802.21 are reproduced below.

The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.). See, e.g., 1.1 of I.E.E.E. P802.21/D.01.09, September 2006, entitled Draft IEEE Standard for Local and Metropolitan Area Networks: Media Independent Handover Services, the entire contents of which document is incorporated herein into and as part of this patent application via being fully incorporated within PART C of the above-referenced provisional application. See Id.

Illustrative Architecture:

FIG. 5 depicts some illustrative architectural components that can be employed in some illustrative and non-limiting implementations including wireless access points to which client devices communicate. In this regard, FIG. 5 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 6 shows an illustrative computer or control unit that can be used to implement computerized process steps, to be carried out by devices, such as, e.g., an access point, a user station, a mobile node or other node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., a conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Background References:

The following background references are incorporated herein by reference in their entireties:

1. Bradner, S., "The Internet Standards Process—Revision 3", BCP 9, RFC 2026, October 1996 (Referred to herein as [RFC2026]).

2. Bradner, S., "IETF Rights in Contributions", BCP 78, RFC 3978, March 2005(Referred to herein as [RFC3978]).

3. Perkins, C., "IP Mobility Support for IPv4", RFC 3344, August 2002 (Referred to herein as [RFC3344]).

4. Aboba, B., Blunk, L., Vollbrecht, J., Carlson, J., and H. Levkowetz, "Extensible Authentication Protocol (EAP)", RFC 3748, June 2004 (Referred to herein as [RFC3748]).

5. Johnson, D., Perkins, C., and J. Arkko, "Mobility Support in IPv6", RFC 3775, June 2004 (Referred to herein as [RFC3775]).

6. Braden, B., Zhang, L., Berson, S., Herzog, S., and S. Jamin, "Resource ReSerVation Protocol (RSVP)—Version 1 Functional Specification", RFC 2205, September 1997 (Referred to herein as [RFC2205]).

7. Malki, K., "Low Latency Handoffs in Mobile IPv4", draft-ietf-mobileip-lowlatency-handoffs-v4-11 (work in progress), October 2005 (Referred to herein as [I-D.aietf-mobileip-lowlatency-handoffs-v4]).

8. Koodli, R., "Fast Handovers for Mobile IPv6", RFC 4068, July 2005 (Referred to herein as [RFC4068]).

9. Liebsch, M., "Candidate Access Router Discovery", draft-ietf-seamoby-card-protocol-08 (work in progress), September 2004 (Referred to herein as [I-D.aietf-seamoby-card-protocol]).

10. Loughney, J., "Context Transfer Protocol", draft-ietf-seamoby-ctp-11 (work in progress), August 2004 (Referred to herein as [I-D.aietf-seamoby-ctp]).

11. Aboba, B., "Extensible Authentication Protocol (EAP) Key Management Framework", draft-ietf-eap-keying-14 (work in progress), June 2006 (Referred to herein as [I-D.aietf-eap-keying]).

12. Forsberg, D., "Protocol for Carrying Authentication for Network Access (PANA)", draft-ietf-pana-pana-12 (work in progress), August 2006 (Referred to herein as [I-D.aietf-pana-pana]).

13. ITU-T, "General Characteristics of International Telephone Connections and International Telephone Circuits: One-Way Transmission Time", ITU-T Recommendation G.114 1998 (Referred to herein as [RG98]).

14. ITU-T, "The E-Model, a computational model for use in transmission planning", ITU-T Recommendation G.107 1998 (Referred to herein as [ITU98]).

15. ETSI, "Telecommunications and Internet Protocol Harmonization Over Networks (TIPHON) Release 3: End-to-end Quality of Service in TIPHON systems; Part 1: General aspects of Quality of Service.", ETSI TR 101 329-6 V2.1.1 (Referred to herein as [ETSI]).

16. Kivinen, T. and H. Tschofenig, "Design of the MOBIKE Protocol", draft-ietf-mobike-design-08 (work in progress), March 2006 (Referred to herein as [I-D.ietf-mobike-design]).

17. Moskowitz, R., "Host Identity Protocol", draft-ietf-hip-base-06 (work in progress), June 2006 (Referred to herein as [I-D.ietf-hip-base]).

18. Almes, G., Kalidindi, S., and M. Zekauskas, "A One-way Delay Metric for IPPM", RFC 2679, September 1999 (Referred to herein as [RFC2679]).

19. Almes, G., Kalidindi, S., and M. Zekauskas, "A One-way Packet Loss Metric for IPPM", RFC 2680, September 1999 (Referred to herein as [RFC2680]).

20. Almes, G., Kalidindi, S., and M. Zekauskas, "A Round-trip Delay Metric for IPPM", RFC 2681, September 1999 (Referred to herein as [RFC2681]).

21. Simpson, W., "IP in IP Tunneling", RFC 1853, October 1995 (Referred to herein as [RFC1853]).

22. Patrick, M., "DHCP Relay Agent Information Option", RFC 3046, January 2001 (Referred to herein as [RFC3046]).

23. Kim, P., Volz, B., and S. Park, "Rapid Commit Option for DHCPv4", draft-ietf-dhc-rapid-commit-opt-05 (work in progress), June 2004 (Referred to herein as [I-D.ietf-dhc-rapid-commit-opt]).

24. Ohba, Y., "Media-Independent Pre-Authentication (MPA) Implementation Results", draft-ohba-mobopts-mpa-implementation-02 (work in progress), March 2006 (Referred to herein as [I-D.ohba-mobopts-mpa-implementation]).

25. Wakikawa, R., "Multiple Care-of Addresses Registration", draft-wakikawa-mobileip-multiplecoa-05 (work in progress), March 2006 (Referred to herein as [I-D.wakikawa-mobileip-multiplecoa]).

26. Manner, J., "NSLP for Quality-of-Service Signaling", draft-ietf-nsis-qos-nslp-11 (work in progress), June 2006 (Referred to herein as [I-D.ietf-nsis-qos-nslp]).

27. Schulzrinne, H. and E. Wedlund, "Application Layer Mobility Using SIP", ACM MC2R (Referred to herein as [SIPMM]).

28. Cambell, A., Gomez, J., Kim, S., Valko, A., and C. Wan, "Design, Implementation, and Evaluation of Cellular IP", IEEE Personal communication August 2000 (Referred to herein as [CELLIP]).

29. Ramjee, R., Porta, T., Thuel, S., Varadhan, K., and S. Wang, "HAWAII: A Domain-based Approach for Supporting Mobility in Wide-area Wireless networks", International Conference on Network Protocols ICNP'99 (Referred to herein as [HAWAII]).

30. Das, S., Dutta, A., Misra, A., and S. Das, "IDMP: An Intra-Domain Mobility Management Protocol for Next Generation Wireless Networks", IEEE Wireless Communication Magazine October 2000 (Referred to herein as [IDMP]).

31. Calhoun, P., Montenegro, G., Perkins, C., and E. Gustafsson, "Mobile IPv4 Regional Registration", draft-ietf-mobileip-reg-tunnel-09 (work in progress), July 2004 (Referred to herein as [I-D.ietf-mobileip-reg-tunnel]).

32. Yokota, H., Idoue, A., and T. Hasegawa, "Link Layer Assisted Mobile IP Fast Handoff Method over Wireless LAN Networks", Proceedings of ACM Mobicom 2002 (Referred to herein as [YOKOTA]).

33. Shin, S., "Reducing MAC Layer Handoff Latency in IEEE 802.11 Wireless LANs", MOBIWAC Workshop (Referred to herein as [MACD]).

34. Dutta, A., Zhang, T., Madhani, S., Taniuchi, K., Ohba, Y., and H. Schulzrinne, "Secured Universal Mobility", WMASH 2004 (Referred to herein as [SUM]).

35. Dutta, A., Madhani, S., and H. Schulzrinne, "Fast handoff Schemes for Application Layer Mobility Management", PIMRC 2004 (Referred to herein as [SIPFAST]).

36. Gwon, Y., Fu, G., and R. Jain, "Fast Handoffs in Wireless LAN Networks using Mobile initiated Tunneling Handoff Protocol for IPv4 (MITHv4)", Wireless Communications and Networking 2003, January 2005 (Referred to herein as [MITH]).

37. "Draft IEEE Standard for Local and Metropolitan Area Networks: Media Independent Handover Services, IEEE P802.21/D00.01," A contribution to IEEE 802.21 WG, July 2005 (Referred to herein as [802.21]).

38. "IEEE Wireless LAN Edition A compilation based on IEEE Std 802.11-1999(R2003)", Institute of Electrical and Electronics Engineers September 2003 (Referred to herein as [802.11]).

39. Dutta, A., "GPS-IP based fast-handoff for Mobiles", NYMAN 2003 (Referred to herein as [GPSIP]).

40. Vatn, J. and G. Maguire, "The effect of using co-located care-of-address on macro handover latency", 14th Nordic Teletraffic Seminar 1998 (Referred to herein as [MAGUIRE]).

41. Mghazli, Y. and J. Bournelle, "MPA using IKEv2 and MOBIKE", draft-yacine-preauth-ipsec-00 IETF (Referred to herein as [mpa-mobike]).

SUMMARY

The preferred embodiments of the present invention improve upon the foregoing and other background technologies.

According to some embodiments, a method for management of an authentication state of a mobile node for media independent pre-authentication with multiple target networks includes: maintaining a state in an authentication agent of a plurality of neighboring networks for a period of time, and when the mobile node moves back and forth between the neighboring networks, employing the maintained state in the authentication agent.

According to some embodiments, a method for management of an authentication state of a mobile node for media independent pre-authentication with multiple target networks includes: when a mobile node that has been authenticated and authorized by an authentication agent in a current network makes a handover to a target network, holding a security association that has been established between the mobile node and the authentication agent (MPA-SA) for a time period after moving from the current network, whereby the mobile node does not have to go through an entire authentication signaling to create a new security association when it returns to the current network. In some examples, the method further includes the authentication agent changing a fully authorized state for the mobile node to an unauthorized state after moving from the current network, and changing the unauthorized state to an authorized state when the mobile node comes back to the current network and provides proof of possession of a key associated with the MPA-SA. In some examples, the method includes wherein while an MPA-SA is being held at an authentication agent, the mobile node updates the authentication agent when an IP address of the mobile node changes due to a handover.

According to some embodiments, a system for management of an authentication state of a mobile node for media independent pre-authentication with multiple target networks includes: the system including a device that is configured such that when a mobile node that has been authenticated and authorized by an authentication agent in a current network makes a handover to a target network, a security association that has been established between the mobile node and the authentication agent (MPA-SA) is held for a time period after moving from the current network, whereby the mobile node does not have to go through an entire authentication signaling to create a new security association when it returns to the current network. In some examples, the system includes means for caching of keys associated with the MPA-SA. In some examples, the system includes a mobile node that is configured such that after the mobile node has been pre-authenticated to an authorizing agent in a candidate target network and has a MPA-SA, the mobile node continues to keep the MPA-SA while it continues to stay in the current network and even after it handovers to a network that is different from the candidate target network.

According to some embodiments, a method for pre-allocation of Quality of Service (QoS) resources for a mobile node before a handover of the mobile node from a current network to a target network includes: employing pre-authentication for bootstrapping a security association for a proactive handover tunnel for carrying application traffic. In some examples, the QoS resources are allocated in an end-to-end fashion executing a protocol over the proactive handover tunnel, and wherein the pre-authentication is used for bootstrapping the security association for the proactive handover tunnel to protect QoS signaling. In some examples, the protocol executed over the proactive handover tunnel includes NSLP or RSVP. In some examples, the method further includes continuously using QoS resources between a correspondent node and a target access router before and after handover. In some examples, the method includes employing duplicate pre-allocation of QoS resources between a target access router in the target network and the mobile node when using pre-allocated QoS resources before handover due to difference in paths between the target access router and the mobile node before and after handover. In some examples, the method includes that wherein QoS resources used for a path between the target access router and the mobile node after handover are pre-allocated by extending a protocol to work for off-path signaling or by media-specific QoS signaling.

According to some embodiments, a system configured for pre-allocation of Quality of Service (QoS) resources for a mobile node before a handover of the mobile node from a current network to a target network, includes a device that is configured to employ pre-authentication for bootstrapping a security association for a proactive handover tunnel for carrying application traffic.

According to some embodiments, a method for enhancing scalability and resource allocation in relation to handover of a mobile node between networks, including establishing multiple tunnels with multiple neighboring target networks that the mobile node may move to includes: while the mobile node is in a current network, performing multiple pre-authentications between the mobile node and authentication agents in multiple neighboring target networks; and while the mobile node is in the current network, performing multiple binding update prior to layer 2 movement of the mobile node. In some examples, the mobile node completes each of pre-authentication, pre-configuration and binding update in relation to multiple candidate target networks while in the current network. In some examples, the mobile node is configured so as to store multiple IP addresses of neighboring networks in cache for a period of time. In some examples, the method further includes establishing transient tunnels with target routers in the multiple neighboring target networks. In some examples, the method further includes for the performing multiple binding update, the mobile node transmits a binding update with multiple IP addresses obtained from the neighboring networks to the correspondent node (CN) and the correspondent node sends multiple transient streams to the mobile node using the transient tunnels. In some examples, the method further includes performing a binding update with multiple contact addresses sent from a mobile node, with multiple media streams stemming out of the correspondent node (CN) using transient tunnels, and including sending another binding update from the mobile node after handover of the mobile node with a new single contact address set to where the mobile node has moved, such that the mobile stops sending media to other neighboring networks where the mobile node did not move. In some examples, the method further includes applying buffering at a target access router or at a home agent, and forwarding transient data to the mobile node after it has moved to a particular target network. In some examples, the method further includes wherein the forwarding is triggered by the mobile node as part of Mobile IP registration or as a separate buffering protocol.

According to some embodiments, a method for minimizing multicast communication interruption of a mobile node subscribing to an IP multicast group when the mobile node moves from a current network to a new network includes: employing media-independent pre-authentication (MPA) in a manner to provide proactive multicast mobility support and to reduce join latency. In some examples, the multicast mobility involves a home subscription-based approach and join latency is reduced by joining a multicast tree proactively. In some examples, a next access router (NAR) is configured to behave as a multicast proxy when the mobile node is about to move to the new network. In some examples, during a pre-configuration phase of the MPA process, after the mobile node has been pre-authenticated, the mobile node passes on information about the multicast group(s) that it is subscribed to. In some examples, the method further includes using PANA as a protocol to pre-configure the mobile node in the current network by interacting with a configuration server in the new network, and having the mobile node pass on its subscribed group information to a PANA authentication agent.

In some examples, the method further includes having the PANA authentication agent communicate with a next access router (NAR) to trigger the multicast to join to the upstream router. In some examples, the method further includes wherein during a tunnel setup process between a mobile node and the next access router, the next access router joins the multicast group on behalf of the mobile node. In some examples, wherein the mobile node directly sends a multicast join request to the next access router (NAR) using a tunnel created in the current network before the mobile node has moved from the current network. In some examples, the method includes wherein a source address of the multicast join request is set to that of a mobile node's tunnel end-point address, so that the next access router can discern from which interface the request has come in and assumes that there is a host subscribed in that interface. In some examples, the method further includes having the next access router configured as a multicast router. In some examples, when the mobile node is in a current network, it still receives multicast traffic via a previous access router (PAR) on the mobile node's currently configured IP address, but when the mobile node moves to the new network and deletes the tunnel, it starts receiving the multicast traffic on the same group multicast address with minimal join latency. In some examples, the mobile node obtains an address ahead of time and does not spend time to configure its interface. In some examples, the multicast mobility involves a remote subscription-based approach and the media independent pre-authentication provides mobility support for multicast services with data being delivered to the mobile in a previous network via a transient MPA tunnel between the mobile node and the next access router. In some examples, as the mobile moves to a new network, a Mobile IP (MIP) tunnel takes care of delivering the multicast traffic in the new network.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 1 and 2 show an illustrative call flow of media independent pre-authentication (MPA);

FIG. 3 shows an illustrative scenario of asymmetric proactive tunnel that can be employed;

FIG. 4 shows an illustrative diagram depicting the bootstrapping of link-layer security according to some examples;

DISCUSSION OF THE PREFERRED EMBODIMENTS

Figure 5:
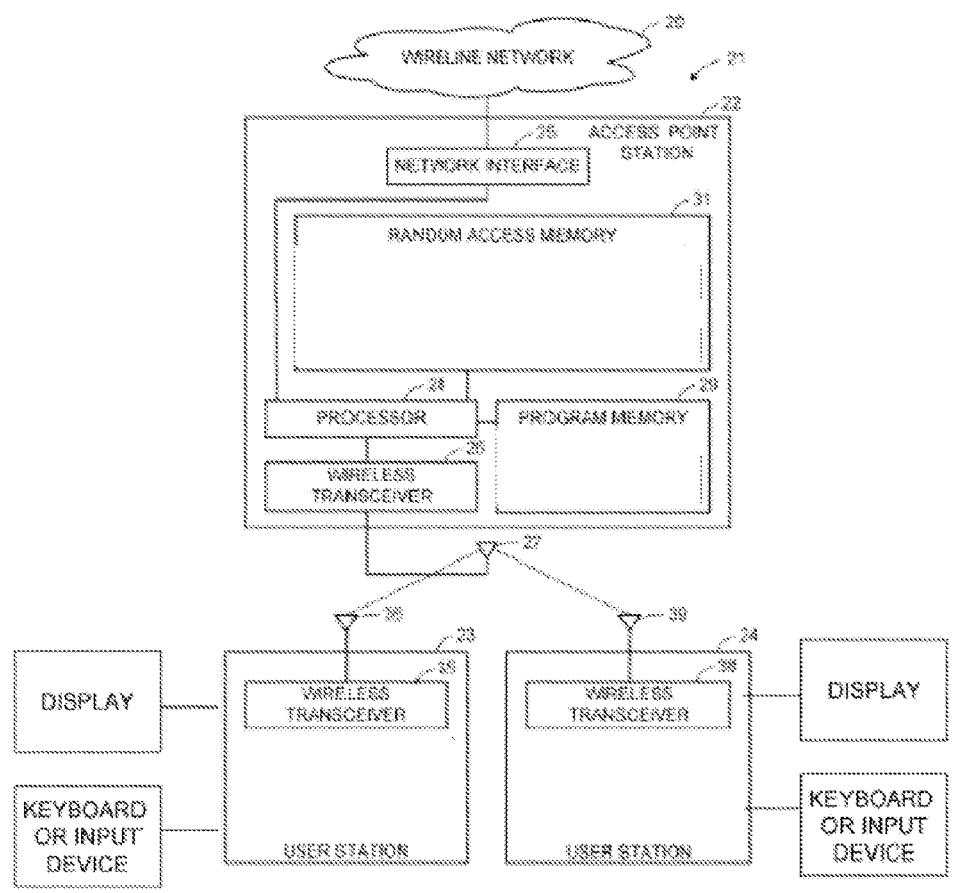
FIG. 5 is an illustrative architectural diagram demonstrating illustrative components of system architecture according to some examples.
Figure 6:
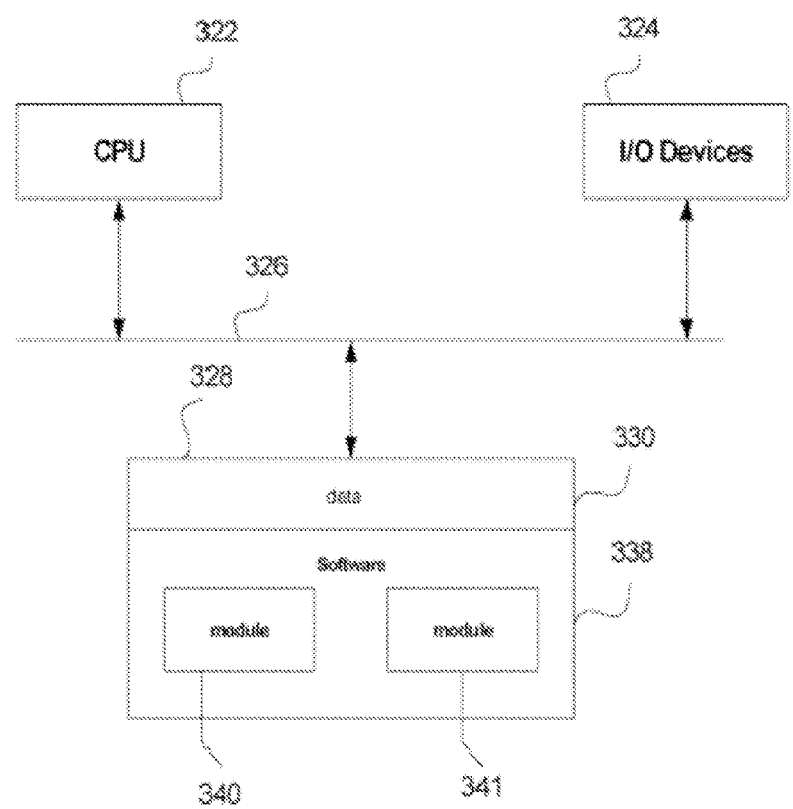
FIG. 6 shows features according to an illustrative computer or control unit that can be used to implement computerized process steps, to be carried out by devices, such as, e.g., an access point, a user station, a source node or destination node in some embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

1. Introduction

As wireless technologies including cellular and wireless LAN are popularly used, supporting terminal handovers across different types of access networks, such as from a wireless LAN to CDMA or to GPRS is considered as a clear challenge. On the other hand, supporting terminal handovers between access networks of the same type is still more challenging, especially when the handovers are across IP subnets or administrative domains. To address those challenges, it is important to provide terminal mobility that is agnostic to link-layer technologies in an optimized and secure fashion without incurring unreasonable complexity. In this document we discuss terminal mobility that provides seamless handovers with low-latency and low-loss. Seamless handovers are characterized in terms of performance requirements as described in Section 1.1.

The basic part of terminal mobility is accomplished by a mobility management protocol that maintains a binding between a locator and an identifier of a mobile terminal, where the binding is referred to as the mobility binding. The locator of the mobile node may dynamically change when there is a movement of the mobile terminal. The movement that causes a change of the locator may occur not only physically but also logically. A mobility management protocol may be defined at any layer. In the rest of this document, the term "mobility management protocol" refers to a mobility management protocol which operates at network layer or higher.

There are several mobility management protocols at different layers. Mobile IP [RFC3344] and Mobile IPv6 [RFC3775] are mobility management protocols that operate at network-layer. There are several ongoing activities in the IETF to define mobility management protocols at layers higher than network layer. For example, MOBIKE (IKEv2 Mobility and Multihoming) [I-D.ietf-mobike-design] is an extension to IKEv2 that provides the ability to deal with a change of an IP address of an IKEv2 end-point. HIP (the Host Identity Protocol) [I-D.ietf-hip-base] defines a new protocol layer between network layer and transport layer to provide terminal mobility in a way that is transparent to both network layer and transport layer. Also, SIPMobility is an extension to SIP to maintain the mobility binding of a SIP user agent [SIPMM].

While mobility management protocols maintain mobility bindings, using them solely in their current form is not sufficient to provide seamless handovers. An additional optimization mechanism that works in the visited network of the mobile terminal to prevent loss of outstanding packets transmitted while updating the mobility binding is needed to achieve seamless handovers. Such a mechanism is referred to as a mobility optimization mechanism. For example, mobility optimization mechanisms [I-D.ietf-mobileip-lowlatency-handoffs-v4] and [RFC4068] are defined for Mobile IPv4 and MobileIPv6, respectively, by allowing neighboring access routers to communicate and carry information about mobile terminals. There are protocols that are considered as "helpers" of mobility optimization mechanisms. The CARD (Candidate Access Router Discovery Mechanism) protocol [I-D.ietf-seamoby-card-protocol] is designed to discover neighboring access routers. The CTP (Context Transfer Protocol) [I-D.ietf-seamoby-ctp] is designed to carry state that is associated with the services provided for the mobile terminal, or context, among access routers.

There are several issues in existing mobility optimization mechanisms. First, existing mobility optimization mechanisms are tightly coupled with specific mobility management protocols. For example, it is not possible to use mobility optimization mechanisms designed for Mobile IPv4 or Mobile IPv6 for MOBIKE. What is strongly desired is a single, unified mobility optimization mechanism that works with any mobility management protocol. Second, there is no existing mobility optimization mechanism that easily supports handovers across administrative domains without assuming a pre-established security association between administrative domains. A mobility optimization mechanism should work across administrative domains in a secure manner only based on a trust relationship between a mobile node and each administrative domain. Third, a mobility optimization mechanism needs to support not only multi-interface terminals where multiple simultaneous connectivity through multiple interfaces can be expected, but also single-interface terminals.

This section describes, among other things, a framework of Media-independent Pre-Authentication (MPA), a new handover optimization mechanism that has a potential to address all those issues. MPA is a mobile-assisted, secure handover optimization scheme that works over any link-layer and with any mobility management protocol including Mobile IPv4, Mobile IPv6, MOBIKE, HIP, SIP mobility, etc. In MPA, the notion of IEEE 802.11i pre-authentication is extended to work at higher layer, with additional mechanisms to perform early acquisition of IP address from a network where the mobile terminal may move as well as proactive handover to the network while the mobile terminal is still attached to the current network. Since this document focuses on the MPA framework, it is left to the future work to choose actual set of protocols for MPA and define detailed operations. The document [I-D.ohba-mobopts-mpa-implementation] provides one method that describes usage and interactions between existing protocols to accomplish MPA functionality.

1.1. Performance Requirements In order to provide desirable quality of service for interactive VoIP and streaming traffic, one needs to limit the value of end-to-end delay, jitter and packet loss to a certain threshold level. ITU-T and ITU-E standards define the acceptable values for these parameters. For example for one-way delay, ITU-T G.114 recommends 150 ms as the upper limit for most of the applications, and 400 ms as generally unacceptable delay. One way delay tolerance for video conferencing is in the range of 200 to 300 ms. Also if an out-of-order packet is received after a certain threshold it is considered lost. References [RFC2679], [RFC2680] and 2681 [RFC2681] describe some of the measurement techniques for delay and jitter.

An end-to-end delay consists of several components, such as network delay, operating system (OS) delay, CODEC delay and application delay. Network delay consists of transmission delay, propagation delay, queueing delay in the intermediate routers. Operating System related delay consists of scheduling behavior of the operating system in the sender and receiver. CODEC delay is generally caused due to packetization and depacketization at the sender and receiver end.

Application delay is mainly attributed to playout delay that helps compensate the delay variation within a network. End-to-end delay and jitter values can be adjusted using proper value of the playout buffer at the receiver end. In case of interactive VoIP traffic, end-to-end delay affects the jitter value and is an important issue to consider. During a mobile's frequent handover, transient traffic cannot reach the mobile and this contributes to the jitter as well.

If the end system has a playout buffer, then this jitter is subsumed by the playout buffer delay, but otherwise this adds to the delay for interactive traffic. Packet loss is typically caused by congestion, routing instability, link failure, lossy links such as wireless links. During a mobile's handover a mobile is subjected to packet loss because of its change in attachment to the network. Thus for both streaming traffic and VoIP interactive traffic packet loss will contribute to the service quality of the real-time application.

Number of packets lost is proportional to the delay during handover and rate of traffic the mobile is receiving. Lost packets contribute to congestion in case of TCP traffic because of re-transmission, but it does not add to any congestion in case of streaming traffic that is RTP/UDP based. Thus it is essential to reduce the packet loss and effect of handover delay in any mobility management scheme. In Section 2, we describe some of the fast-handover scheme that have tried to reduce the handover delay.

According to ETSI TR 101 [ETSI] a normal voice conversation can tolerate up to 2% packet loss. If a mobile is subjected to frequent handoff during a conversation, each handoff will contribute to packet loss for the period of handoff. Thus maximum loss during a conversation needs to be reduced to an acceptable level. There is no clear threshold value for packet loss for streaming application, but it needs to be reduced as much as possible to provide better quality of service to a specific application.

2. Existing Work on Fast-Handover

While basic mobility management protocols such as Mobile IP [RFC3344], Mobile IPv6 [RFC3775], SIP-Mobility [SIPMM] offer solutions to provide continuity to TCP and RTP traffic, these are not optimized to reduce the handover latency during mobile's frequent movement between subnets and domains. In general these mobility management protocols suffer from handover delays incurred at several layers such as layer 2, layer 3 and application layer for updating the mobile's mobility binding.

There have been several optimization techniques that apply to currently mobility management schemes that try to reduce handover delay and packet loss during a mobile's movement between cells, subnet and domain. There are few micro-mobility management schemes [CELLIP], [HAWAII], and intra-domain mobility management schemes such as [IDMP], [I-D.ietf-mobileip-reg-tunnel] that provide fast-handover by limiting the signaling updates within a domain. Fast Mobile IP protocols for IPv4 and IPv6 networks [I-D.ietf-mobileip-lowlatencyhandoffs-v4], [RFC4068] provide fast-handover techniques that utilize mobility information made available by the link layer triggers.

Yokota et al. [YOKOTA] propose joint use of access point and dedicated MAC bridge to provide fast-handover without altering MIPv4 specification. [MACD] scheme reduces the delay due to MAC layer handoff by providing a cache-based algorithm.

Some of the mobility management schemes use dual interfaces thus providing make-before-break scenario [SUM]. In a make-before-break situation communication usually continues with one interface, when the secondary interface is in the process of getting connected. The IEEE 802.21 working group is discussing these scenarios in details [802.21]. Providing fast-handover using a single interface needs more careful design techniques than for a client with multiple interfaces. [SIPFAST] provides an optimized handover scheme for SIPbased mobility management, where the transient traffic is forwarded from the old subnet to the new one by using an application layer forwarding scheme. [MITH] provides a fast handover scheme for a single interface case that uses mobile initiated tunneling between the old foreign agent and new foreign agent. [MITH] defines two types of handover schemes such as Pre-MIT and Post-MIT. Proposed MPA scheme is very similar in nature to MITH's predictive scheme where the mobile communicates with the foreign agent before actually moving to the new network. However the proposed MPA scheme described in this document is not limited to MIP type mobility protocol only and in addition this scheme takes care of movement between domains and performs pre-authentication in addition to proactive handover. Thus the proposed scheme reduces the overall delay to close to link-layer handover delay.

3. Terminology

Mobility Binding:

A binding between a locator and an identifier of a mobile terminal. Mobility Management Protocol (MMP):

A protocol that operates at network layer or higher to maintain a binding between a locator and an identifier of a mobile terminal.

Binding Update:

A procedure to update a mobility binding.

Media-independent Pre-Authentication Mobile Node (MN):

A mobile terminal of media-independent pre-authentication (MPA) which is a mobile-assisted, secure handover optimization scheme that works over any link-layer and with any mobility management protocol. An MPA mobile node is an IP node. In this document, the term "mobile node" or "MN" without a modifier refers to "MPA mobile node". An MPA mobile node usually has a functionality of a mobile node of a mobility management protocol as well.

Candidate Target Network (CTN):

A network to which the mobile may move in the near future.

Target Network (TN):

The network to which the mobile has decided to move. The target network is selected from one or more candidate target network.

Proactive Handover Tunnel (PHT):

A bidirectional IP tunnel that is established between the MPA mobile node and an access router of a candidate target network.

In this document, the term "tunnel" without a modifier refers to "proactive handover tunnel".

Point of Attachment (PoA):

A link-layer device (e.g., a switch, an access point or a base station, etc.) that functions as a link-layer attachment point for the MPA mobile node to a network.

Care-of Address (CoA):

An IP address used by a mobility management protocol as a locator of the MPA mobile node.

4. MPA Framework

4.1. Overview

Media-independent Pre-Authentication (MPA) is a mobile-assisted, secure handover optimization scheme that works over any link-layer and with any mobility management protocol. With MPA, a mobile node is not only able to securely obtain an IP address and other configuration parameters for a CTN, but also able to send and receive IP packets using the obtained IP address before it actually attaches to the CTN. This makes it possible for the mobile node to complete the binding update of any mobility management protocol and use the new CoA before performing a handover at link-layer.

This functionality is provided by allowing a mobile node, which has a connectivity to the current network but is not yet attached to a CTN, to (i) establish a security association with the CTN to secure the subsequent protocol signaling, then (ii) securely execute a configuration protocol to obtain an IP address and other parameters from the CTN as well as a execute tunnel management protocol to establish a PHT between the mobile node and an access router of the CTN, then (iii) send and receive IP packets, including signaling messages for binding update of an MMP and data packets transmitted after completion of binding update, over the PHT using the obtained IP address as the tunnel inner address, and finally (iv) deleting or disabling the PHT immediately before attaching to the CTN when it becomes the target network and then re-assigning the inner address of the deleted or disabled tunnel to its physical interface immediately after the mobile node is attached to the target network through the interface. Instead of deleting or disabling the tunnel before attaching to the target network, the tunnel may be deleted or disabled immediately after being attached to the target network.

Especially, the third procedure makes it possible for the mobile to complete higher-layer handover before starting link-layer handover.

This means that the mobile is able to send and receive data packets transmitted after completion of binding update over the tunnel, while it is still able to send and receive data packets transmitted before completion of binding update outside the tunnel.

In the above four basic procedures of MPA, the first procedure is referred to as "pre-authentication", the second procedure is referred to as "pre-configuration", the combination of the third and fourth procedures are referred to as "secure proactive handover". The security association established through pre-authentication is referred to as an "MPA-SA".

4.2. Functional Elements

In the MPA framework, the following functional elements are expected to reside in each CTN to communicate with a mobile node:

Authentication Agent (AA), Configuration Agent (CA) and Access Router (AR). Some or all of those elements can be placed in a single network device or in separate network devices. An authentication agent is responsible for pre-authentication. An authentication protocol is executed between the mobile node and the authentication agent to establish an MPA-SA. The authentication protocol needs to be able to derive a key between the mobile node and the authentication agent and should be able to provide mutual authentication. The authentication protocol should be able to interact with a AAA protocol such as RADIUS and Diameter to carry authentication credentials to an appropriate authentication server in the AAA infrastructure. The derived key is used for further deriving keys used for protecting message exchanges used for pre-configuration and secure proactive handover. Other keys that are used for bootstrapping link-layer and/or network-layer ciphers MAY also be derived from the MPA-SA. A protocol that can carry EAP [RFC3748] would be suitable as an authentication protocol for MPA.

A configuration agent is responsible for one part of pre-configuration, namely securely executing a configuration protocol to securely deliver an IP address and other configuration parameters to the mobile node. The signaling messages of the configuration protocol needs to be protected using a key derived from the key corresponding to the MPA-SA. An access router is a router that is responsible for the other part of pre-configuration, i.e., securely executing a tunnel management protocol to establish a proactive handover tunnel to the mobile node.

The signaling messages of the configuration protocol needs to be protected using a key derived from the key corresponding to the MPA-SA. IP packets transmitted over the proactive handover tunnel should be protected using a key derived from the key corresponding to the MPA-SA.

4.3. Basic Communication Flow

Assume that the mobile node is already connected to a point of attachment, say oPoA (old point of attachment), and assigned a care-of address, say oCoA (old care-of address). The communication flow of MPA is described as follows. Throughout the communication flow, data packet loss should not occur except for the period during the switching procedure in Step 5, and it is the responsibility of link-layer handover to minimize packet loss during this period.

Step 1 (pre-authentication phase): The mobile node finds a CTN through some discovery process and obtains the IP addresses, an authentication agent, a configuration agent and an access router in the CTN by some means. The mobile node performs pre-authentication with the authentication agent. If the pre-authentication is successful, an MPA-SA is created between the mobile node and the authentication agent. Two keys are derived from the MPA-SA, namely an MN-CA key and an MN-AR key, which are used to protect subsequent signaling messages of a configuration protocol and a tunnel management protocol, respectively. The MN-CA key and the MN-AR key are then securely delivered to the configuration agent and the access router, respectively.

Step 2 (pre-configuration phase): The mobile node realizes that its point of attachment is likely to change from oPoA to a new one, say nPoA (new point of attachment). It then performs pre-configuration, with the configuration agent using the configuration protocol to obtain an IP address, say nCoA (new care-of address), and other configuration parameters from the CTN, and with the access router using the tunnel management protocol to establish a proactive handover tunnel. In the tunnel management protocol, the mobile node registers oCoA and nCoA as the tunnel outer address and the tunnel inner address, respectively. The signaling messages of the pre-configuration protocol are protected using the MN-CA key and the MN-AR key. When the configuration and the access router are co-located in the same device, the two protocols may be integrated into a single protocol like IKEv2. After completion of the tunnel establishment, the mobile node is able to communicate using both oCoA and nCoA by the end of Step 4.

Step 3 (secure proactive handover main phase): The mobile node decides to switch to the new point of attachment by some means. Before the mobile node switches to the new point of attachment, it starts secure proactive handover by executing binding update of a mobility management protocol and transmitting subsequent data traffic over the tunnel (main phase). In some cases, it may like to cache multiple nCOA addresses and perform simultaneous binding with the CH or HA.

Step 4 (secure proactive handover pre-switching phase): The mobile node completes binding update and becomes ready to switch to the new point of attachment point. The mobile may execute the tunnel management protocol to delete or disable the proactive handover tunnel and cache nCoA after deletion or disabling of the tunnel. The decision as to when the mobile node is ready to switch to the new point of attachment depends on handover policy.

Step 5 (switching): It is expected that a link-layer handover occurs in this step.

Step 6 (secure proactive handover post-switching phase): The mobile node executes the switching procedure. Upon successful completion of the switching procedure, the mobile node immediately restores the cached nCoA and assigns it to the physical interface attached to the new point of attachment. If the proactive handover tunnel was not deleted or disabled in Step 4, the tunnel is deleted or disabled as well. After this, direct transmission of data packets using nCoA is possible without using a proactive handover tunnel. An example call flow of MPA is shown in FIG. 1 and FIG. 2.

5. Detailed Issues

In order to provide an optimized handover for a mobile experiencing rapid subnet and domain handover, one needs to look into several issues. These issues include discovery of neighboring networking elements, choosing the right network to connect to based on certain policy, changing the layer 2 point of attachment, obtaining an IP address from a DHCP or PPP server, confirming the uniqueness of the IP address, pre-authenticating with the authentication agent, sending the binding update to the correspondent host and obtaining the redirected streaming traffic to the new point of attachment, ping-pong effect, probability of moving to more than one network and associating with multiple target networks. We describe these issues in details in the following paragraphs and describe how we have optimized these in case of MPA-based secure proactive handover.

5.1. Discovery

Discovery of neighboring networking elements such as access points, access routers, authentication servers help expedite the handover process during a mobile's rapid movement between networks. By discovering the network neighborhood with a desired set of coordinates, capabilities and parameters the mobile can perform many of the operation such as pre-authentication, proactive IP address acquisition, proactive address resolution, and binding update while in the previous network.

There are several ways a mobile can discover the neighboring networks. The Candidate Access Router Discovery protocol [I-D.ietfseamoby-card-protocol] helps discover the candidate access routers in the neighboring networks. Given a certain network domain SLP and DNS help provide addresses of the networking components for a given set of services in the specific domain. In some cases many of the network layer and upper layer parameters may be sent over link-layer management frames such as beacons when the mobile approaches the vicinity of the neighboring networks. IEEE 802.11u is considering issues such as discovering neighborhood using information contained in link-layer. However, if the link-layer management frames are encrypted by some link-layer security mechanism, then the mobile node may not be able to obtain the requisite information before establishing link-layer connectivity to the access point. In addition this may add burden to the bandwidth constrained wireless medium. In such cases a higher layer protocol is preferred to obtain the information regarding the neighboring elements. There is some proposal such as [802.21] that helps obtain this information about the neighboring networks from a mobility server. When the mobile's movement is imminent, it starts the discovery process by querying a specific server and obtains the required parameters such as the IP address of the access point, its characteristics, routers, SIP servers or authentication servers of the neighboring networks. In the event of multiple networks, it may obtain the required parameters from more than one neighboring networks and keep these in cache. At some point the mobile finds out several CTN's out of many probable networks and starts the pre-authentication process by communicating with the required entities in the CTN's. Further details of this scenario is in Section 5.2.

5.2. Pre-Authentication in Multiple CTN Environment

In some cases, although a mobile decides a specific network to be the target network, it may actually end up with moving into a neighboring network other than the target network due to factors that are beyond the mobile's control. Thus it may be useful to perform the pre-authentication with a few probable candidate target networks and establish time-bound tunnels with the respective access routers in those networks. Thus in the event of a mobile moving to a candidate target network other than that was chosen as the target network, it will not be subjected to packet loss due to authentication and IP address acquisition delay that could incur if the mobile did not pre-authenticate with that candidate target network. It may appear that by pre-authenticating with a number of candidate target networks and reserving the IP addresses, the mobile is provisioning the resources that could be used otherwise. But since this happens for a time-limited period it should not be a big problem. Mobile uses pre-authentication procedure to obtain IP address proactively and set up the time bound tunnels with the access routers of the candidate target networks. Also MN may hold some or all of the nCoAs for future movement. Mobile may choose one of these addresses as the binding update address and send it to the CN (Correspondent Node) or HA (Home Agent), and will thus receive the tunneled traffic via the target network while in the previous network. But in some instances, the mobile may eventually end up moving to a network that is other than the target network. Thus there will be a disruption in traffic as the mobile moves to the new network since the mobile has to go through the process of assigning the new IP address and sending the binding update again. Two solutions can be proposed to take care of this problem. Mobile can take advantage of the simultaneous mobility binding and send multiple binding updates to the corresponding host or HA. Thus the corresponding host or HA forwards the traffic to multiple IP addresses assigned to the virtual interfaces for a specific period of time. This binding update gets refreshed at the CH after the mobile moves to the new network, thus stopping the flow to the other candidate networks. Reference [I-D.wakikawa-mobileipmultiplecoa] discusses different scenarios of mobility binding with multiple care-of-addresses. In case simultaneous binding is not supported in a specific mobility scheme, forwarding of traffic from the previous target network will help take care of the transient traffic until the new binding update goes from the new network.

5.3. Proactive IP Address Acquisition

In general a mobility management protocol works in conjunction with Foreign Agent or in co-located address mode. MPA approach can use both co-located address mode and foreign agent address mode. We discuss here the address assignment component that is used in collocated address mode. There are several ways a mobile node can obtain an IP address and configure itself. Most commonly a mobile can configure itself statically in the absence of any configuring element such as a server or router in the network. The IETF Zeroconf working group defines auto-IP mechanism where a mobile is configured in an ad-hoc manner and picks a unique address from a specified range such as 169.254.x.x. In a LAN environment the mobile can obtain IP address from DHCP servers. In case of IPv6 networks, a mobile has the option of obtaining the IP address using stateless auto-configuration or DHCPv6. In a wide area networking environment, mobile uses PPP to obtain the IP address by communicating with a NAS.

Each of these processes takes of the order of few hundred milliseconds to few seconds depending upon the type of IP address acquisition process and operating system of the clients and servers. Since IP address acquisition is part of the handover process, it adds to the handover delay and thus it is desirable to reduce this timing as much as possible. There are few optimized techniques such as DHCP Rapid Commit [I-D.ietf-dhc-rapid-commit-opt], GPS-coordinate based IP address [GPSIP] available that attempt to reduce the handover time due to IP address acquisition time. However in all these cases the mobile also obtains the IP address after it moves to the new subnet and incurs some delay because of the signaling handshake between the mobile node and the DHCP server.

In the following paragraph we describe few ways a mobile node can obtain the IP address proactively from the CTN and the associated tunnel setup procedure. These can broadly be defined into four categories such as PANA-assisted proactive IP address acquisition, IKE-assisted proactive IP address acquisition, proactive IP address acquisition using DHCP only and stateless auto-configuration.

5.3.1. PANA-Assisted Proactive IP Address Acquisition

In case of PANA-assisted proactive IP address acquisition, the mobile node obtains an IP address proactively from a CTN. The mobile node makes use of PANA [I-D.ietf-pana-pana] messages to trigger the address acquisition process on the DHCP relay agent that co-locates with PANA authentication agent in the access router in the CTN. Upon receiving a PANA message from the mobile node, the DHCP relay agent performs normal DHCP message exchanges to obtain the IP address from the DHCP server in the CTN. This address is piggy-backed in a PANA message and is delivered to the client. In case of MIPv6 with stateless auto-configuration, the router advertisement from the new target network is passed to the client as part of PANA message. Mobile uses this prefix and its MAC address to construct the unique IPv6 address as it would have done in the new network. Mobile IPv6 in stateful mode works very similar to DHCPv4. 5.3.2. IKEv2-assisted proactive IP address acquisition IKEv2-assisted proactive IP address acquisition works when an IPsec gateway and a DHCP relay agent are resident within each access router in the CTN. In this case, the IPsec gateway and DHCP relay agent in a CTN help the mobile node acquire the IP address from the DHCP server in the CTN. The MN-AR key established during the pre-authentication phase is used as the IKEv2 pre-shared secret needed to run IKEv2 between the mobile node and the access router. The IP address from the CTN is obtained as part of standard IKEv2 procedure, with using the co-located DHCP relay agent for obtaining the IP address from the DHCP server in the target network using standard DHCP. The obtained IP address is sent back to the client in the IKEv2 Configuration Payload exchange. In this case, IKEv2 is also used as the tunnel management protocol for a proactive handover tunnel (see Section 5.6). Alternatively VPN-GW can itself dispense the IP address from its IP address pool.

5.3.3. Proactive IP Address Acquisition Using DHCP Only

As another alternative, DHCP may be used for proactively obtaining an IP address from a CTN without relying on PANA or IKEv2-based approaches by allowing direct DHCP communication between the mobile node and the DHCP relay or DHCP server in the CTN. In this case, the mobile node sends a unicast DHCP message to the DHCP relay agent or DHCP server in the CTN requesting an address, while using the address associated with the current physical interface as the source address of the request.

When the message is sent to the DHCP relay agent, the DHCP relay agent relays the DHCP messages back and forth between the mobile node and the DHCP server. In the absence of a DHCP relay agent the mobile can also directly communicate with the DHCP server in the target network. The broadcast option in client's unicast DISCOVER message should be set to 0 so that the relay agent or the DHCP server can send back the reply directly to the mobile using the mobile node's source address. This mechanism works as well for an IPv6 node using stateful configuration.

In order to prevent malicious nodes from obtaining an IP address from the DHCP server, DHCP authentication should be used or the access router should install a filter to block unicast DHCP message sent to the remote DHCP server from mobile nodes that are not pre-authenticated. When DHCP authentication is used, the DHCP authentication key may be derived from the MPA-SA established between the mobile node and the authentication agent in the candidate target network.

The proactively obtained IP address is not assigned to the mobile node's physical interface until the mobile has moved to the new network. The IP address thus obtained proactively from the target network should not be assigned to the physical interface but rather to a virtual interface of the client. Thus such a proactively acquired IP address via direct DHCP communication between the mobile node and the DHCP relay or the DHCP server in the CTN may be carried with additional information that is used to distinguish it from other address assigned to the physical interface.

Upon the mobile's entry to the new network, the mobile node can perform DHCP over the physical interface to the new network to get other configuration parameters such as SIP server, DNS server, etc., by using e.g., DHCP INFORM. This should not affect the ongoing communication between the mobile and correspondent host. Also, the mobile node can perform DHCP over the physical interface to the new network to extend the lease of the address that was proactively obtained before entering the new network.

5.3.4. Proactive IP Address Acquisition Using Stateless Autoconfiguration

In case of IPv6, network address configuration is done either using DHCPv6 or stateless autoconfiguration. In order to obtain the new IP address proactively, the router advertisement of the next hop router can be sent over the established tunnel, and a new IPv6 address is generated based on the prefix and MAC address of the mobile.

Generating a COA from the new network will avoid the time needed to obtain an IP address and perform the Duplicate Address Detection.

In order to maintain the DHCP binding for the mobile node and keep track of the dispensed IP address before and after the secure proactive handover, the same DHCP client identifier needs to be used for the mobile node for both DHCP for proactive IP address acquisition and DHCP performed after the mobile node enters the target network. The DHCP client identifier may be the MAC address of the mobile node or some other identifier. In case of stateless autoconfiguration, the mobile checks to see the prefix of the router advertisement in the new network and matches it with the prefix of newly assigned IP address. If these turn out to be the same then the mobile does not go through the IP address acquisition phase again.

5.4. Address Resolution Issues

5.4.1. Proactive Duplicate Address Detection

When the DHCP server dispenses an IP address, it updates its lease table, so that this same address is not given to another client for that specific period of time. At the same time the client also keeps a lease table locally so that it can renew when needed. In some cases, where a network consists of both DHCP and non-DHCP enabled clients, there is a probability that another client with the LAN may have been configured with an IP address from the DHCP address pool. In such scenario the server does a duplicate address detection based on ARP (Address Resolution Protocol) or IPv6 Neighbor Discovery before assigning the IP address. This detection procedure may take up to 4 sec to 15 sec [MAGUIRE] and will thus contribute to a larger handover delay. In case of proactive IP address acquisition process, this detection is performed ahead of time and thus does not affect the handover delay at all. By performing the duplicate address detection ahead of time, we reduce the handover delay factor.

5.4.2. Proactive Address Resolution Update

During the process of pre-configuration, the address resolution mappings needed by the mobile node to communicate with nodes in the target network after attaching to the target network can also be known, where the nodes may be the access router, authentication agent, configuration agent and correspondent node. There are several possible ways of performing such proactive address resolution.

Use an information service mechanism [802.21] to resolve the MAC addresses of the nodes. This might require each node in the target network to involve in the information service so that the server of the information service can construct the database of proactive address resolution.

Extend the authentication protocol used for pre-authentication or the configuration protocol used for pre-configuration to support proactive address resolution. For example, if PANA is used as the authentication protocol for pre-authentication, PANA messages may carry AVPs used for proactive address resolution. In this case, the PANA authentication agent in the target network may perform address resolution for on behalf of the mobile node.

One can also make use of DNS to map the MAC address of the specific interface associated with a specific IP address of the network element in the target network. One may define a new DNS resource record (RR) to proactively resolve the MAC addresses of the nodes in the target network. But this approach may have its own limitations since a MAC address is a resource that is bound to an IP address, not directly to a domain name.

When the mobile node attaches to the target network, it installs the proactively obtained address resolution mappings without necessarily performing address resolution query for the nodes in the target network.

On the other hand, the nodes that reside in the target network and are communicating with the mobile node should also update their address resolution mappings for the mobile node as soon as the mobile node attaches to the target network. The above proactive address resolution methods could also be used for those nodes to proactively resolve the MAC address of the mobile node before the mobile node attaches to the target network. However, this is not useful since the those nodes need to detect the attachment of the mobile node to the target network before adopting the proactively resolved address resolution mapping. A better approach would be integration of attachment detection and address resolution mapping update. This is based on gratuitously performing address resolution [RFC3344], [RFC3775] in which the mobile node sends an ARP Request or an ARP Reply in the case of IPv4 or a Neighbor Advertisement in the case of IPv6 immediately after the mobile node attaches to the new network so that the nodes in the target network can quickly update the address resolution mapping for the mobile node.

5.5. Pre-Authentication with FA-CoA

In many of the deployment scenarios such as in IMS/MMD (IP Multimedia Subsystem/Multimedia Domain) architecture using MIPv4 as the binding protocol, IP address of the mobile does not change as the mobile moves from one visited network to another. A typical example is when the mobile uses MIPv4 and uses FA Care-of-Address and interacts with outbound SIP proxy. In such a situation the mobile has only Home Address (HoA) on its interface. MPA mechanism in its current form will give rise to routing loop, if the mobile uses HoA as the outer address of the MPA proactive tunnel described previously.

In this scenario while the mobile is still with pFA, if it sets up a proactive tunnel with nFA using the HoA as the outer address and sends the binding update with nFA's care-of-address, then any packet destined to mobile will first be routed to nFA and then because of the associated tunnel, it will be sent back to the HA, resulting in a routing loop.

In order to take care of this routing problem we propose different ways of creating two tunnels such as forward proactive and reverse proactive tunnels. Forward proactive tunnel helps tunnel the traffic from nFA to MN whereas the packets from the mobile goes over the reverse proactive tunnel. We propose to use p-FA's CoA as the tunnel outer address of the MN for forward proactive tunnel and propose to use mobile's HoA as the outer address of the reverse proactive tunnel. Traffic destined to HoA when arrives at nFA will get routed to pFA over proactive tunnel using the host based routing set up at nFA. FIG. 3 shows a scenario of asymmetric proactive tunnel that is needed to care of this routing loop.

5.6. Tunnel Management

After an IP address is proactively acquired from the DHCP server in a CTN, a proactive handover tunnel is established between the mobile node and the access router in the CTN. The mobile node uses the acquired IP address as the tunnel inner address.

The proactive handover tunnel is established using a tunnel management protocol. When IKEv2 is used for proactive IP address acquisition, IKEv2 is also used as the tunnel management protocol.

Alternatively, when PANA is used for proactive IP address acquisition, PANA may be used as the secure tunnel management protocol.

Once the proactive handover tunnel is established between the mobile node and the access router in the candidate target network, the access router also needs to perform proxy address resolution on behalf of the mobile node so that it can capture any packets destined to the mobile node's new address.

Since mobile needs to be able to communicate with the correspondent node while in the previous network some or all parts of binding update and data from the correspondent node to mobile node need to be sent back to the mobile node over a proactive handover tunnel. Details of these binding update procedure are described in Section 5.6.

In order for the traffic to be directed to the mobile node after the mobile node attaches to the target network, the proactive handover tunnel needs to be deleted or disabled. The tunnel management protocol used for establishing the tunnel is used for this purpose. Alternatively, when PANA is used as the authentication protocol the tunnel deletion or disabling at the access router can be triggered by means of PANA update mechanism as soon as the mobile moves to the target network. A link-layer trigger ensures that the mobile node is indeed connected to the target network and can also be used as the trigger to delete or disable the tunnel.

5.7. Binding Update

There are several kinds of binding update mechanisms for different mobility management schemes. In case of Mobile IPv4 and Mobile IPv6, the mobile performs binding update with the home agent only, if route optimization is not used. Otherwise, the mobile performs binding update with both the home agent (HA) and corresponding node (CN). In case of SIP-based terminal mobility the mobile sends binding update using Re-INVITE to the correspondent node and REGISTER message to the Registrar. Based on the distance between the mobile and the correspondent node the binding update may contribute to the handover delay. SIP-fast handover [SIP-FAST] provides several ways of reducing the handover delay due to binding update. In case of secure proactive handover using SIP-based mobility management we rule out the delay due to binding update completely, as it takes place in the previous network. Thus this scheme looks more attractive when the correspondent node is too far from the communicating mobile node. Similarly in case of Mobile IPv6, the mobile sends the newly acquired CoA from the target network as the binding update to the HA and CN.

Also all signaling messages between MN and HA and between MN and CN are passed through this proactive tunnel that is set up. These messages include Binding Update (BU), Binding Acknowledgement (BA) and the associated return routability messages such as Home Test Init (HoTI), Home Test (HoT), Care-of Test Init (CoTI), Care-of Test (COT).

If the proactive handover tunnel is realized as an IPsec tunnel, it will also protect these signaling messages between the tunnel end points and will make the return routability test securer. Any subsequent data will also be tunneled through as long as the mobile is in the previous network. The accompanying document [I-D.ohbamobopts-mpa-implementation] talks about the details of how binding updates and signaling for return routability are sent over the secured tunnel.

5.8. Preventing Packet Loss 5.8.1. Packet Loss Prevention in Single Interface MPA For single interface MPA, there may be some transient packets during link-layer handover that is directed to the mobile node at the old point of attachment before the mobile node is able to attach to the target network. Those transient packets can be lost. The use of a general purpose buffer at the access router of the old point of attachment can eliminate packet loss. Intelligent buffering techniques that is signalled from the MN can temporarily hold transient traffic during handover and then these packets can be forwarded to the MN once it is reachable in the target network.

An alternative method is to use bicasting. However, it does not eliminate packet loss if link-layer handover is not seamlessly performed. On the other hand, buffering does not reduce packet delay. While packet delay can be compensated by playout buffer at the receiver side for streaming application, playout buffer does not help much for interactive VoIP application which cannot tolerate for large delay jitters. Thus it is still important to optimize the link-layer handover anyway.

5.8.2. Packet Loss Prevention in Multi-Interface MPA

MPA usage in multi-interface handover scenario involves preparing the second interface for use via the current active interface.

Preparation would involve pre-authentication and provisioning at a target network where the second interface would be the eventual active interface. An example, would be inter-technology handover from a Wi-Fi to a CDMA network where pre-authentication at the CDMA network can be performed via the Wi-Fi interface. Handover occurs when the CDMA interface becomes the active interface for the MN. In such scenario, if handover occurs while both interfaces are active, there is generally no packet loss since transient packets directed towards the old interface will still reach the MN. However, if sudden disconnection of the current active interface is used to initiate handover to the prepared interface then transient packets for the disconnected interface will be lost while the MN attempts to be reachable at the prepared interface. In such cases, a specialized form of buffering can be used to eliminate packet loss where packets are merely copied at an access router in the current active network prior to disconnection. If sudden disconnection does occur, copied packets can be forwarded to the MN once the prepared interface becomes the active reachable interface. The copy-and-forward mechanism is not limited to multi-interface handover.

Single interface scenarios can also employ copy-and-forwarding instead of general buffering though its use is most obvious in sudden disconnection scenario. A notable side-effect of this process is the possible duplication of packets during forwarding at the new active interface. Several approaches can be employed to minimize this effect. Relying on upper layer protocols such as TCP to detect and eliminate duplicates is the most common way. Specialized duplicate detection and handling mechanisms can also be used. In general, packet duplication is a well-know issue that can be handled locally by the MN. A lengthy detection of a disconnection event of the current active interface can also have an adverse effect on the length of the handover process. Thus, it becomes necessary to use an optimized scheme of detecting interface disconnection in such scenarios.

5.8.3. Reachability Test

In addition to previous techniques, the MN may also ensure reachability to the new point of attachment before switching from the old one. This can be done by exchanging link-layer management frames with the new point of attachment. This reachability check should be performed as quickly as possible. In order to prevent packet loss during this reachability check, transmission of packets over the link between the MN and old point of attachment should be suspended by buffering the packets at the both ends of the link during the reachability check. How to perform this buffering would be appreciated by those in the art. Some of the results using this buffering scheme have been explained in the accompanying implementation document.

5.9. Considerations for Failed Switching and Switch-Back

Ping-Pong effect is one of the common problems found during handover scenario. Ping-pong effect arises when a mobile is situated at the borderline of the cell or decision point and a handover procedure is frequently executed. This results in higher call drop probability, lower connection quality, increased signaling traffic and waste of resources. All of these affect mobility optimization. Handoff algorithms are the deciding factors for performing the handoff between the networks. Traditionally these algorithms employ a threshold to compare the values of different metrics to decide on the handoff. These metrics include signal strength, path loss, carrier-to-interference ratios (CIR), Signal to Interference Ratios (SIR), Bit Error Rate (BER), power budget etc. In order to avoid ping-pong effect some additional parameters are employed by the decision algorithm such as hystereris margin, dwell timers, and averaging window. For a high moving vehicle, other parameters such as distance between the mobile node and the point of attachment, velocity of the mobile, location of the mobile, traffic and bandwidth characteristics are also taken into account to reduce the ping-pong effect. Most recently, there are other handoff algorithms that help reduce the ping-pong effect in a heterogeneous network environment that are based on techniques such as hypothesis testing, dynamic programming and pattern recognition techniques. While it is important to devise smart handoff algorithms to reduce the ping-pong effect, it is also important to devise methods to recover from these effect. In the case of MPA framework, ping-pong effect will result in the back-and-forth movement of the mobile between current network and target network and between the candidate target networks. MPA in its current form will be affected because of numerous tunnel setup, number of binding updates and associated handoff latency resulting out of ping-pong situation. Since ping-pong effect is related to handoff rate, it may also contribute to delay and packet loss. We propose several algorithms that will help reduce the probability of ping-pong and propose several methods for the MPA framework so that it can recover from the packet loss resulting out of ping-pong effect.

MPA framework can take advantage of the mobile's geo-location with respect to APs in the neighboring networks using GPS. In order to avoid the oscillation between the networks, a location-based intelligent algorithm can be derived by using a co-relation between user's location and cached data from the previous handover attempts.

In some cases only location may not be the only indicator for a handoff decision. For example in Manhattan type networks, although a mobile is close to an AP, it may not have enough SNR (Signal to Noise Ration) to make a good connection. Thus knowledge of mobility pattern, dwell time in a call and path identification will help avoid the ping-pong problem to a great extent.

In the absence of a good handoff algorithm that can avoid ping-pong effect, it may be required to put in place a good recovery mechanism so as to mitigate the effect of Ping-Pong. It may be necessary to keep the established context in the current network for a period of time, so that it can be quickly recovered when the mobile comes back to the network where the context was last used. These context may include security association, IP address used, tunnels established, etc. Bicasting the data to both previous network and new network for a predefined period will also the mobile help take care of the lost packets in case the mobile moves back and forth between the networks.

The mobile should be able to determine if it is in a stable state with respect to ping-pong situation.

When MPA framework takes advantage of a combination of IKEv2 and MOBIKE, the ping-pong effect can be reduced further [mpa-mobike].

5.10. Authentication State Management

In case of pre-authentication with multiple target networks, one needs to maintain the state in the authentication agent of each of the neighboring networks for certain time. Thus in the event the mobile does move back and forth between neighboring networks, already maintained authentication state can be helpful. We provide some highlights on multiple security association state management below.

A MN that has pre-authenticated to an authentication agent in a candidate target network and has a MPA-SA may need to continue to keep the MPA-SA while it continues to stay in the current network or even after it handovers to a network that is different from the candidate target network.

When an MN that has been authenticated and authorized by an authentication agent in the current network makes a handover to a target network, it may want to hold the SA that has been established between the MN and the authentication agent for a certain time period so that it does not have to go through the entire authentication signaling to create an SA from scratch in case it returns to the previous network due to ping-pong effect. Such an SA being held at the authentication agent after the MN's handover to other network is considered as an MPA-SA. In this case, the authentication agent should change the fully authorized state for the MN to an unauthorized state. The unauthorized state can be changed to the fully authorized state only when the MN comes back to the network and provides a proof of possession of a key associated with the MPA-SA.

While an MPA-SA is being held at an authentication agent, the MN will need to keep updating the authentication agent when an IP address of the MN changes due to a handover.

5.11. Pre-Allocation of QoS Resources

In the pre-configuration phase, it is also possible to pre-allocate QoS resources that may be used by the mobile node not only after handover but also before handover. When pre-allocated QoS resources are used before handover, it is used for application traffic carried over a proactive handover tunnel.

It is possible that QoS resources are pre-allocated in an end-to-end fashion. One method to achieve this proactive end-to-end QoS reservation is to execute NSIS Signaling Layer Protocol (NSLP) [I-D.ietf-nsis-qos-nslp] or Resource ReserVation Protocol (RSVP) [RFC2205] over a proactive handover tunnel where pre-authentication can be used for bootstrapping a security association for the proactive handover tunnel to protect the QoS signaling. In this case, QoS resources are pre-allocated on the path between the correspondent node and a target access router can be used continuously before and after handover. On the other hand, duplicate pre-allocation of QoS resources between the target access router and the mobile node would be necessary when using pre-allocated QoS resources before handover due to difference in paths between the target access router and the mobile node before and after handover.

QoS resources to be used for the path between the target access router and the mobile node after handover may be pre-allocated by extending NSLP to work for off-path signaling (Note: this path can be viewed as off-path before handover) or by media-specific QoS signaling.

5.12. Scalability and Resource Allocation

In case of multiple CTNs, establishing multiple tunnels with the neighboring target networks provides some additional benefits. But, it also contributes to some scalability and resource utilization issues as well. Pre-authentication process with multiple candidate target networks can happen in several ways.

The very basic scheme involves authenticating the mobile with the multiple authentication agents in the neighboring networks, but actual pre-configuration and binding update take place only after layer 2 movement to a specific network is complete. By having the pre-authentication done ahead of time, the mobile does not need to do any more authentication after it moves to the new network.

Configuration and binding updates actually take place after the mobile has moved to the new network and thus may contribute to the delay.

Similarly, in addition to pre-authentication, the mobile can also complete the pre-configuration while in the previous network, but can postpone the binding update until after the mobile has moved. This way, the mobile can obtain multiple IP addresses from the neighboring networks ahead of time but store these in the cache for a certain period. By being able to cache the IP addresses from the neighboring networks, the mobile does not need to spend any additional time for the IP address acquisition after the handover. Like the previous case, in this case the mobile also does not need to set up the preconfigured the tunnels. While pre-authentication process and part of pre-configuration process are taken care of before the mobile has moved to the new network, binding update is actually done after the mobile has moved.

The third type of multiple pre-authentication involves all the three steps while the mobile is in the previous networks, such as authentication, configuration and binding update. But, this specific process utilizes the most amount of resources. Some of the resources that get used during this process are as follows:

1) Additional signaling for pre-authentication in the neighboring networks.

2) Holding the IP address of the neighboring networks in mobiles cache for certain amount of time. It needs additional processing in the mobile for storing these IP addresses. In addition it also uses up the temporary IP addresses from the neighboring routers.

3) There is an additional cost associated with setting up additional transient tunnels with the target routers in the neighboring networks and mobile.

4) In case of binding update with multiple IP addresses obtained from the neighboring networks, multiple transient streams flow between the CN and mobile using these transient tunnels.

When only pre-authentication and pre-configuration are done ahead of time with multiple networks, the mobile sends one binding update to the CN. In this case it is important to find out when to send the binding update after the layer 2 handoff.

In case binding update with multiple contact addresses is sent, multiple media streams stem out of CN using the transient tunnels. But in that case one needs to send another Binding Update after the handover with the contact address set to the new address (only one address) where the mobile has moved. This way the mobile stops sending media to other neighboring networks where the mobile did not move.

The following is an illustration of this specific case that takes care of multiple binding streams, when the mobile moves only to a specific network, but sends multiple binding updates in the previous network. MN sends a binding update to CH with multiple contact addresses such as c1, c2, and c3 that were obtained from three neighboring networks. This allows the CN to send transient multiple streams to the mobile over the pre-established tunnels. After the mobile moves to the actual network, it sends another binding update to the CN with the care-of-address of the mobile in the network where the mobile has moved in. Some of the issues with multiple stream are consumption of extra bandwidth for a small period of time.

Alternatively, one can apply the buffering technique at the target access router or at the home agent. Transient data can be forwarded to the mobile after it has moved in. Forwarding of data can be triggered by the mobile either as part of Mobile IP registration or as a separate buffering protocol.

5.13. Link-Layer Security and Mobility

Using the MPA-SA established between the mobile node and the authentication agent for a CTN, during the pre-authentication phase, it is possible to bootstrap link-layer security in the CTN while the mobile node is in the current network in the following way. For reference, FIG. 4 is an illustrative diagram depicting the bootstrapping of link-layer security according to some examples.

(1) The authentication agent and the mobile node derives a PMK (Pairwise Master Key) [I-D.ietf-eap-keying] using the MPA-SA that is established as a result of successful pre-authentication. Executions of EAP and an AAA protocol may be involved during pre-authentication to establish the MPA-SA. From the PMK, distinct TSKs (Transient Session Keys) [I-D.ietf-eap-keying] for the mobile node are directly or indirectly derived for each point of attachment of the CTN.

(2) The authentication agent may install the keys derived from the PMK and used for secure association to points of attachment. The derived keys may be TSKs or intermediary keys from which TSKs are derived.

(3) After the mobile node chooses a CTN as the target network and switches to a point of attachment in the target network (which now becomes the new network for the mobile node), it executes a secure association protocol such as IEEE 802.11i 4-way handshake [802.11i] using the PMK in order to establish PTKs (Pair-wise Transient Keys) and GTKs (Group Transient Keys) [I-D.ietf-eap-keying] used for protecting link-layer packets between the mobile node and the point of attachment. No additional execution of EAP authentication is needed here.

(4) While the mobile node is roaming in the new network, the mobile node only needs to perform a secure association protocol with its point of attachment point and no additional execution of EAP authentication is needed either. Integration of MPA with link-layer handover optimization mechanisms such as 802.11r can be archived this way.

The mobile node may need to know the link-layer identities of the point of attachments in the CTN to derive TSKs. If PANA is used as the authentication protocol for pre-authentication, this is possible by carrying Device-Id AVPs in the PANA-Bind-Request message sent from the PAA [I-D.ietf-pana-pana], with each AVP containing the BSSID of a distinct access point.

5.14. Authentication in Initial Network Attachment

When the mobile node initially attaches to a network, network access authentication would occur regardless of the use of MPA. The protocol used for network access authentication when MPA is used for handover optimization can be a link-layer network access authentication protocol such as IEEE 802.1x or a higher-layer network access authentication protocol such as PANA. 5.15. Multicast Mobility Group-based communication is always receiver driven. A specific mobile can subscribe to one or more IP multicast group. When a mobile moves to a new network multicast communication is interrupted because of the associated join latency. This interruption can be minimized by reducing the join latency during the mobile's movement. Multicast mobility can be home subscription based or remote subscription based. In home subscription-based approach there is a multicast router in the home network, that joins on behalf of the mobile. But, all the data and control signal are tunneled between the home agent and foreign agent or the mobile. Home subscription based approach is not suitable for mobility protocols other than MIPv4 or MIPv6 as it depends upon the multicast router at the home network and the tunnel. On the other hand remote subscription-based approach does not add any burden on the home agent unlike the previous approach but communicates with the first hop router in the remote network every time it moves. MPA can help to provide proactive multicast mobility support for both the approaches. We first describe the remote subscription-based approach in case of MPA.

There are two ways to reduce the join latency in case of MPA by joining the multicast tree proactively. In MPA scenario, Next Access Router (NAR) can behave as the multicast proxy when the mobile is about to move to the new network. During the pre-configuration phase of the MPA process after the mobile has been pre-authenticated, the mobile can pass on the information about the multicast groups that it is currently subscribed to. As an example, if PANA is used as the protocol to pre-configure the mobile in the current network by interacting with the configuration server in the next network, then it can also pass on the currently subscribed group information to the PAA (Pana Authentication Agent) as part of the PUR message. PAA in turn can communicate with the NAR to trigger the multicast join to the upstream router. Thus during the tunnel setup process between the mobile and NAR, NAR also joins the multicast group on behalf of the mobile. Alternatively, the mobile can directly send the multicast join request to the NAR using the tunnel created in the current network even before the mobile has moved in. In this case the source address of the multicast join request will be set to that of mobile's tunnel end-point address, so that the NAR can figure out from which interface the request has come in and assumes that there is a host subscribed in that interface. In both the cases we assume that NAR is configured as a multicast router as well. When the mobile is in the current network, it can still receive the multicast traffic via the previous access network (PAR) on its currently configured IP address. But as soon as the mobile moves to the new network and deletes the tunnel, it starts receiving the multicast traffic on the same group multicast address with almost zero join latency. Since the mobile already has obtained an address ahead of time it also does not need to spend any time to configure its interface. In case of home subscription based approach, MPA can provide the mobility support for multicast services the way it provides unicast services for both MIPv4 and MIPv6. The data gets delivered to the mobile in the previous network via the transient MPA tunnel between the mobile and the next access router.

This tunnel is usually a tunnel within a tunnel. As the mobile moves to the new network, regular MIP tunnel takes care of delivering the multicast traffic in the new network. This mechanism provides fast delivery of multicast stream, as the home agent has already started to send multicast traffic destined to the new network.

5.16. IP Layer Security and Mobility

IP layer security is typically maintained between the mobile and first hop router or any other network element such as SIP proxy by means of IPsec. This IPSec SA can be set up either in tunnel mode or in ESP mode. However as the mobile moves IP address of the router and outbound proxy will change in the new network, mobile's IP address may or may not change depending upon the mobility protocol being used. This will warrant re-establishing a new security association between the mobile and the desired network entity. In some cases such as in 3GPP/3GPP2 IMS/MMD environment data traffic is not allowed to pass through unless there is an IPsec SA established between the mobile and outbound proxy. This will of course add unreasonable delay to the existing real-time communication during mobile's movement. In this scenario key exchange is done as part of SIP registration that follows a key exchange procedure called AKA (Authentication and Key Agreement).

MPA can be used to bootstrap this security association as part of pre-authentication via the new outbound proxy. Prior to the movement, if the mobile can pre-register via the new outbound proxy in the target network and completes the pre-authentication procedure, then the new SA state between the mobile and new outbound proxy can be established prior to the movement to the new network. A similar approach can also be applied if a key exchange mechanism other than AKA is used or the network element with which the security association has to be established is different than an outbound proxy.

By having the security association established ahead of time, the mobile does not need to involve in any exchange to set up the new security association after the movement. Any further key exchange will be limited to renew the expiry time. This will also reduce the delay for real-time communication as well.

5.17. Applicability of MPA to other Fast-handoff Techniques

There are some similarities between the techniques associated with MPA and other related fast-handoff mechanisms such as proactive part of FMIPv6. Experimental results from both of these handoff techniques demonstrate that these results are bounded by layer 2 delay. However, if these could be augmented by IEEE 802.21 network discovery mechanism, layer 2 handoff delay can also be optimized.

This has been demonstrated in the accompanying draft [I-D.ohbamobopts-mpa-implementation]. On the other hand, certain features of MPA could also be used to enhance the functionality of FMIPv6 [RFC4068]. In particular, MPA's pre-authentication feature for both layer2 and layer3, and stateful pre-configuration feature can also be used for FMIPv6.

6. Security Considerations

This document describes a framework of a secure handover optimization mechanism based on performing handover-related signaling between a mobile node and one or more candidate target networks to which the mobile node may move in the future. This framework involves acquisition of the resources from the CTN as well as data packet redirection from the CTN to the mobile node in the current network before the mobile node physically connects to one of those CTN.

Acquisition of the resources from the candidate target networks must accompany with appropriate authentication and authorization procedures in order to prevent unauthorized mobile node from obtaining the resources. For this reason, it is important for the MPA framework to perform pre-authentication between the mobile node and the candidate target networks. The MN-CA key and the MN-AR key generated as a result of successful pre-authentication can protect subsequent handover signaling packets and data packets exchanged between the mobile node and the MPA functional elements in the CTN's.

The MPA framework also addresses security issues when the handover is performed across multiple administrative domains. With MPA, it is possible for handover signaling to be performed based on direct communication between the mobile node and routers or mobility agents in the candidate target networks. This eliminates the need for a context transfer protocol for which known limitations exist in terms of security and authorization. [I-D.ietf-eap-keying]. For this reason, the MPA framework does not require trust relationship among administrative domains or access routers, which makes the framework more deployable in the Internet without compromising the security in mobile environments.

Broad Scope Of The Invention:

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example" and "i.a." which means "inter alia."

What is claimed is:

1. A method for enhancing scalability and resource allocation in relation to handover of a mobile node between networks, including establishing multiple tunnels with multiple neighboring target networks that the mobile node may move to, comprising:
while the mobile node is in a current network, performing multiple pre-authentications between the mobile node and authentication agents in multiple neighboring target networks; and
while the mobile node is in the current network, performing multiple binding update prior to layer 2 movement of the mobile node;
wherein said mobile node completes each of pre-authentication, pre-configuration and binding update in relation to multiple candidate target networks while in the current network;
wherein said mobile node is configured so as to store multiple IP addresses of neighboring networks in cache for a period of time;
further including establishing transient tunnels with target routers in the multiple neighboring target networks;
further including for said performing multiple binding update, said mobile node transmits a binding update with multiple IP addresses obtained from the neighboring networks to the correspondent node (CN) and the correspondent node sends multiple transient streams to the mobile node using the transient tunnels; and
further including sending another binding update from the mobile node after handover of the mobile node with a new single contact address set to where the mobile node has moved, such that the mobile node stops sending media to other neighboring networks where the mobile node did not move.

2. A method for enhancing scalability and resource allocation in relation to handover of a mobile node between networks, including establishing multiple tunnels with multiple neighboring target networks that the mobile node may move to, comprising:
while the mobile node is in a current network, performing multiple pre-authentications between the mobile node and authentication agents in multiple neighboring target networks;
while the mobile node is in the current network, performing multiple binding update prior to layer 2 movement of the mobile node;
wherein said mobile node completes each of pre-authentication, pre-configuration and binding update in relation to multiple candidate target networks while in the current network;
further including said performing multiple binding update including performing a binding update with multiple contact addresses obtained by said mobile node from the multiple neighboring target networks and sent from a mobile node, with multiple media streams stemming out of the correspondent node (CN) using transient tunnels established with said multiple neighboring target networks; and
further including sending another binding update from the mobile node after handover of the mobile node with a new single contact address set to where the mobile node has moved, such that the mobile node stops sending media to other neighboring networks where the mobile node did not move.

3. The method of claim 1, including applying buffering at a target access router or at a home agent, and forwarding transient data to the mobile node after it has moved to a particular target network.

4. The method of claim 3, wherein said forwarding is triggered by the mobile node as part of Mobile IP registration or as a separate buffering protocol.

* * * * *

UNITED STATES PATENT AND TRADEMARK OFFICE
CERTIFICATE OF CORRECTION

PATENT NO. : 8,701,164 B2
APPLICATION NO. : 13/207027
DATED : April 15, 2014
INVENTOR(S) : Dutta et al.

It is certified that error appears in the above-identified patent and that said Letters Patent is hereby corrected as shown below:

On the Title Page, Item (54), and in the Specification, in Column 1, Line 1, in Title, delete "CASHING" and insert -- CACHING --, therefor.

On the Title Page, Item (73), under "Assignees", in Column 1, Line 2, delete "Teleordia" and insert -- Telcordia --, therefor.

On Title Page 2, Item (56), under "OTHER PUBLICATIONS", in Column 1, Line 15, delete "Netgworking" and insert -- Networking --, therefor.

On Title Page 2, Item (56), under "OTHER PUBLICATIONS", in Column 1, Line 17, delete "currect" and insert -- correct --, therefor.

On Title Page 2, Item (56), under "OTHER PUBLICATIONS", in Column 1, Line 26, delete "foir" and insert -- for --, therefor.

On Title Page 2, Item (56), under "OTHER PUBLICATIONS", in Column 2, Line 42, delete "WMASH 2004, 2004," and insert -- WMASH 2004, --, therefor.

On Title Page 3, Item (56), under "OTHER PUBLICATIONS", in Column 2, Line 3, delete "IDMP-" and insert -- IDMP: --, therefor.

In the Specification

In Column 4, Line 65, delete "desk-top" and insert -- desktop --, therefor.

In Column 6, Line 5, delete "[I-D.aietf-" and insert -- [I-D.ietf- --, therefor.

In Column 6, Line 11, delete "[I-D.aietf-seamoby-" and insert -- [I-D.ietf-seamoby- --, therefor.

Signed and Sealed this
Twenty-eighth Day of October, 2014

Michelle K. Lee
*Deputy Director of the United States Patent and Trademark Office*

CERTIFICATE OF CORRECTION (continued)
U.S. Pat. No. 8,701,164 B2

In Column 6, Line 16, delete "[I-D.aietf-seamoby-ctp])." and insert -- [I-D.ietf-seamoby-ctp]). --, therefor.

In Column 6, Lines 19-20, delete "[I-D.aietf-eap-keying])." and insert -- [I-D.ietf-eap-keying]). --, therefor.

In Column 6, Line 23, delete "[I-D.aietf-" and insert -- [I-D.ietf- --, therefor.